3,222,348
POLYMERIZATION OF CONJUGATED DIOLEFINS WITH A COBALT OR NICKEL COMPOUND-ALUMINUM HALIDE-TIN HYDROCARBYL HYDRIDE CATALYST
Edward W. Duck and Jacques A. Waterman, Amsterdam, Netherlands, assignors to Shell Oil Company, New York, N.Y., a corporation of Delaware
No Drawing. Filed Apr. 25, 1962, Ser. No. 189,960
Claims priority, application Netherlands, July 17, 1961, 267,161
2 Claims. (Cl. 260—94.3)

This invention relates to catalyst composition. Moreover it relates to the use of said catalyst composition in the polymerization of conjugated diene.

It is known that conjugated dienes may be polymerized to produce synthetic elastomers wherein the product has a high proportion of cis 1,4-addition product. Thus, it is known, for example, that isoprene may be polymerized with a catalyst that is the reaction product of an aluminum alkyl or aluminum alkyl halide reacted with a metal halide wherein the metal is selected from Groups IV–VI of the Periodic Table. A representative catalyst in this category is the reaction product of aluminum diethyl chloride and titanium tetrachloride. Still other catalysts are known which will produce cis 1,4-enchainment of conjugated dienes. Those catalysts, however, have the disadvantage of being extremely sensitive to oxygen, moisture, and other impurities so that the polymerization can only be effected after suitable and elaborate steps are taken to exclude atmospheric and other impurities from the system. The present invention provides novel compositions that are suitable as catalysts for the polymerization of conjugated dienes, the catalysts being considerably more insensitive to atmospheric impurities and thereby permits less rigid control of the polymerization process.

It is an object of this invention to provide novel and improved catalysts for the polymerization of conjugated dienes. It is a further object of this invention to provide such catalysts which are more stable and insensitive when exposed to the atmosphere. It is yet another object of this invention to provide such catalysts which are also capable of polymerizing conjugated dienes to produce high proportions of the cis 1,4-addition products. Still other objects will become apparent as the description of this invention proceeds.

Another object of the invention comprises the provision of a process for the preparation of polymers of conjugated dienes having a high cis 1,4-content.

Now in accordance with the present invention, a composition is provided comprising the reaction product of an aluminum halide of a halogen having an atomic number of 17–35, a tin hydrocarbyl hydride and a compound of a metal having an atomic number of 27–28. Still in accordance with this invention, a process is provided for the polymerization of conjugated dienes wherein a product having a high cis 1,4-content is obtained.

More particularly, the novel reaction product useful as a catalyst in this system comprises aluminum chloride or aluminum bromide reacted with a tin hydrocarbyl hydride wherein the hydrocarbyl radical has from 1 to 8 carbon atoms and a hydrocarbon soluble cobalt compound. Still in accordance with the present invention, a still more preferred catalyst reaction product comprises the reaction of aluminum chloride, a tin alkyl hydride containing either 2 or 3 alkyl radicals having from 2 to 6 carbon atoms each and a hydrocarbon soluble cobalt salt of a carboxylic acid having at least 8 carbon atoms per molecule.

The tin hydrocarbyl hydrides comprise those having the general formula $$Sn(R)_{4-x}(H)_x$$

wherein R is a hydrocarbyl radical preferably having 1–8 carbon atoms and $x$ is a number larger than 0 and smaller than 4. Typical tin hydrocarbyl hydrides include the following:

Tin triethyl hydride
Tin diethyl dihydride
Tin tributyl hydride
Tin dibutyl dihydride
Tin ethyl propyl dihydride
Tin diethyl propyl hydride
Tin dihexyl dihydride
Tin diphenyl dihydride
Tin triphenyl hydride
Tin phenyl ethyl dihydride
Tin diphenyl ethyl hydride
Tin phenyl diethyl hydride
Tin dibenzyl dihydride The cobalt and/or nickel compound are preferably those which are soluble in hydrocarbon solvents and, more particularly, those that are soluble in aromatic solvents such as benzene, toluene, and the like. Particularly preferred are the cobalt or nickel salts of organic acids such as naphthenic acids and aliphatic acids, whether branched, straight-chained, saturated or unsaturated. Also suitable are hydrocarbon soluble complexes of cobalt or nickel halides with amines, such as pyridine, complexes of the halides with alcohols, ketones, aluminum halides such as aluminum chlorides or aluminum alkyl compounds, and the like. The hydrocarbon soluble cobalt or nickel halide complexes may be prepared by mixing and reacting the halide with the complexing compound. Thereafter the solid fraction, if any is present, is separated and the liquid is recovered and used as a component in the instant compositions.

The several components employed in the preparation of the instant compositions may be brought together and reacted in any order. Further, two of the components may be reacted, aged or stored as desired and the remaining component added any time thereafter. It is observed, however, that the compositions are more active catalysts for the polymerization of conjugated dienes when the hydrides and the aluminum halide are reacted first. The reaction of these components preferably is at temperatures ranging from 20–150° C. in the presence of an inert hydrocarbon diluent. Thereafter, the product thus obtained is reacted with the cobalt or nickel compounds. The composition thus prepared is ready for use as a polymerization catalyst although it will be found to be advantageous to react the whole composition further at elevated temperatures for a few minutes. Thereafter, the solid phase, if any exists, is separated. When the composition is to be used for the polymerization of conjugated dienes, a particularly suitable method of procedure is to first react the aluminum halide with the hydride, preferably at elevated temperatures and in the presence of a diluent. The monomer to be polymerized is then contacted with the reaction product under the conditions that cause the monomer to begin polymerization. A suitable polymerization, however, does not occur until the cobalt or nickel compound is added. By this procedure, a very active polymerization catalyst is formed within a few minutes.

The quantity of the various components employed in preparing the novel compositions may vary within wide limits and the amounts that are ultimately used depend upon the selection of the variable involved. Such variables include the choice of monomer that may be polymerized, the polymerization temperature, the choice of cobalt compound or complex, the aging conditions employed for the catalyst preparation, and the like. Since the present invention affords improvements and advantages by reason of the presence of the tin compounds, it will be seen that any amount of the hydrides may be employed. It is useful, however, to express the proportion of the components in terms of a ratio of the sum of aluminum and tin to cobalt and/or nickel, expressed in atoms. Generally, the ratio ranges from about 10:1 to 100,000:1. In the more preferred embodiments of the invention, the ratio of aluminum to tin, expressed in atoms, is between 0.01 and 100, and more preferably 0.1 and 5. It is an unusual feature of the present invention that compounds of cobalt and nickel which are soluble in inert hydrocarbon solvents, when employed as compounds in the instant catalyst for the polymerization of conjugated dienes, are surprisingly very active even at very low concentrations. Thus, concentrations that are lower than about 0.5 milliatom of cobalt and/or nickel per liter of solvent are quite active as are amounts as low as 0.01–0.03 milliatom per liter of solvent. For these reasons, it will be seen that considerable economy of catalyst components is an attractive feature of the present invention. Additionally, the small amount of cobalt or nickel that is contained in the soluble form of the catalyst need not be removed from the resulting polymer.

*Example I*

Comparative runs were carried out in reactors of 100 ml. content, from which the air had been expelled by means of dry, oxygen-free nitrogen. The catalyst components were put into these reactors as indicated in the table below. When $AlCl_3$ was used together with a tin compound, the two components were previously mixed without a diluent in the manner indicated in the table. The cobalt compound was invariably the last component admixed. It was previously dissolved in benzene at room temperature. Immediately after the admixture of this solution the reactors were placed in a cooling bath and butadiene was passed through. In the runs in which the process according to the invention was applied, polymerization set in almost instantaneously.

Until the end of the run the mixtures were invariably kept practically saturated with butadiene. Finally, the polymer formed was precipitated by the addition of isopropanol, filtered off, washed with fresh isopropanol and dried in vacuo at 60° C.

In the table the various conditions and the results are recorded. In the runs in which the invention was applied (6 to 8) the results were very favorable, unlike those obtained in the runs (1 to 4) recorded for purposes of comparison.

vention include 2,3-dimethyl-1,3-butadiene; 2-ethyl-1,3-butadiene; 4-methyl-1,3-hexadiene; 2-methyl-1,3-pentadiene; 2-isopropyl-1,3-butadiene; 2-amyl-1,3-butadiene and the like as well mixtures thereof.

The catalyst may be prepared in any suitable vessel that is closed to the atmosphere. Desirably, the vessel is flushed with an inert gas, as nitrogen, before the various ingredients are charged. Caution should be exercised as the components are added as the formation of the catalyst may be accompanied by the evolution of heat and cooling may be necessary. It is the better practice to store the catalyst in glass or glass lined vessels although the catalyst may be suitably stored in vessels of Hastelloy B or C or tantalum.

In conducting the polymerizations of this invention temperatures ranging from about −40° C. to about 150° C. may be employed. The particular temperature selected will vary depending upon certain variables which are inherent in the process. For example, the present invention is characterized by fast polymerization rates. In some cases it may be desirable therefore to conduct the polymerization at lower temperatures to slow down the polymerization. The slowdown of the polymerization in such cases facilitates production control and minimizes the danger of damaging the polymerization apparatus. In other cases, particularly where the catalyst is less active, it may be desirable to operate at the higher temperature, i.e., in the order of 40–100° C. or even 150° C. Another outstanding advantage of this invention is that the polymerization, in most cases, may be conducted easily at about room temperatures thereby minimizing the cost of heat transfer equipment.

Another advantage of the present processes for polymerizing conjugated dienes is that the polymerizations are conducted at low pressures in the preferred procedures. In actual practice all that is normally required is that the polymerization reactor be sealed so as to exclude the atmosphere from the reactor. This is desirable because oxygen and moisture are harmful to the polymerization. Accordingly, in the preferred embodiment it will be found that atmospheric pressures are suitable when the polymerization is conducted at about room temperatures. When the polymerization is conducted at higher temperatures then high pressure will be created within the reactor but in almost all instances it is unnecessary to increase the pressure from external sources. The preferred pressures are suitably defined as "autogenic pressures" which refers to the pressure created by the system under the conditions of reaction. Such pressures will vary depending upon the temperature, the nature and quantity of the diluent, and the like.

| Run | Tin Compound | | $AlCl_3$, mmoles/ liter | Cobalt Compound, milliatoms Co per liter | | Benzene, ml. | Polymerization Conditions | | Rate of Polymerization g./l.h. | Structure of Polymer, Percent | | | Conditions When Mixing $AlCl_3$ with Tin Compounds |
|---|---|---|---|---|---|---|---|---|---|---|---|---|---|
| | Formula | Concentration, mmoles/ liter | | Naph- thenate | Octoate | | Time, min. | Temp., ° C. | | cis | trans | 1.2 | |
| 1 | | | 16.5 | 2.0 | | 45.5 | 12 | 0 | 0 | | | | |
| 2 | $SnCl_4$ | 104 | 36 | 2.0 | | 40.3 | 20 | 0 | 0 | | | | 4 min. steam bath. |
| 3 | $Sn(C_2H_3)_3Cl$ | 40 | 16.1 | 2.0 | | 34.5 | 30 | 0 | 0 | | | | Do. |
| 4 | $Sn(n-butyl)_4$ | 34 | 16.1 | 2.0 | | 46.6 | 45 | 0 | 9 | 11 | 66 | 23 | Do. |
| 5 | $Sn(n-butyl)_4$ | 30 | 15 | 2.0 | | 50 | 45 | 25 | 8 | 15 | 63 | 22 | Do. |
| 6 | $Sn(C_2H_5)_3H$ | 71 | 30 | 2.0 | | 50.2 | 4 | 25 | 950 | 94 | 4 | 2 | 6 min., 25° C. |
| 7 | $Sn(C_2H_5)_3H$ | 74 | 30.6 | | 2.0 | 48.9 | 4 | 25 | 953 | 94 | 4 | 2 | Do. |
| 8 | $Sn(C_2H_5)_3H$ | 50 | 10.4 | | 0.84 | 71.6 | 30 | 25 | 42 | 93 | 4 | 3 | Do. |

Polymerization of conjugated dienes is normally effected in the presence of a hydrocarbon diluent and preferably this is at least partially constituted of the diluent employed in the preparation of the catalyst described hereinbefore. The use of the novel catalysts of this invention has been found to produce products having an exceptionally high cis 1,4-content as compared with other catalyst systems. This is illustrated by the comparative examples in this specification. In addition to butadiene and isoprene, other conjugated dienes which may be polymerized according to the process of the present in- The polymerization may be begun by merely charging the catalyst to a solution of a conjugated diene in the hydrocarbon diluent while agitating the contents of the reactor. The catalyst is added to the reactor in such a manner that it does not come in contact with the atmosphere. Accordingly, the reactor is equipped with suitable fixtures to permit such charging of the catalyst and the conjugated diene. A typical procedure comprises preparing a solution of the conjugated diene in a separate vessel and thereafter metering the thus prepared solution to the reactor. If desired, the solution of the conjugated diene in the hydrocarbon diluent may be prepared in the polymerization reactor. It is best that the monomeric conjugated diene and catalyst be throughly mixed from the start and in a batch reactor this is simply accomplished by agitation while adding the catalyst. In continuous operations, which employ, for example, a tubular reactor, this may be accomplished by feeding the catalyst in at a point near the inlet for the diene. In batch and continuous operations the residence time of the polymerization mixture is controlled by any suitable means which are shown in the art.

As the polymerization proceeds the polymer will form and remain in solution so that at the end of the polymerization cycle a viscous liquid is obtained. The polymer is recovered by the addition of a coagulating agent as acetone, a lower alcohol, such as methanol, ethanol, or the like, whereupon a coagulum of the polymer is formed. The polymer is then recovered by merely separating the solid polymer from the liquid. It is another advantage of this invention that the coagulum need not be treated further in order to separate catalyst residues as the residues are sufficiently low after the first coagulation. This is of considerable importance since several washings of the polymer were necessary heretofore.

We claim as our invention:

1. A process for the preparation of an elastomer having a cis 1,4-content in excess of about 90%, which comprises polymerizing a $C_{4-5}$ conjugated diene at temperatures from $-40°$ to $150°$ C. in the presence of a catalyst comprising the reaction product of aluminum chloride, a tin alkyl hydride having the general formula $$Sn(R)_{4-x}(H)_x$$

wherein R is an alkyl radical having 2–6 carbon atoms and $x$ is 1–2, and a hydrocarbon-soluble cobalt salt of a carboxylic acid having at least 8 carbon atoms per molecule, the atomic ratio of aluminum to tin being between 0.1:1 and 5:1 and the atomic ratio of aluminum plus tin to cobalt being between about 10:1 and 100,000:1, said catalyst being prepared in the presence of a hydrocarbon diluent and being soluble in said diluent.

2. A process according to claim 1 wherein the diene is butadiene.

References Cited by the Examiner
UNITED STATES PATENTS

| | | | |
|---|---|---|---|
| 3,066,125 | 11/1962 | Porter et al. | 260—94.3 |
| 3,066,126 | 11/1962 | Porter et al. | 260—94.3 |
| 3,066,128 | 11/1962 | Youngman | 260—94.3 |
| 3,068,217 | 12/1962 | Higgins et al. | 260—94.3 |
| 3,088,940 | 5/1963 | Jenkins | 260—88.7 |

JOSEPH L. SCHOFER, *Primary Examiner.*